(12) United States Patent
Lee et al.

(10) Patent No.: US 12,512,841 B2
(45) Date of Patent: Dec. 30, 2025

(54) DATA RECEPTION DEVICE BASED ON LOW-POWER DIGITAL DELAY-LOCKED LOOP HAVING SKEW CORRECTION FUNCTION

(71) Applicant: RAMSCHIP, INC., Seongnam-si (KR)

(72) Inventors: Bong-Joon Lee, Seongnam-si (KR); Jae-Gan Ko, Seongnam-si (KR)

(73) Assignee: RAMSCHIP, INC., Seongnam-si (KR)

( * ) Notice: Subject to any disclaimer, the term of this patent is extended or adjusted under 35 U.S.C. 154(b) by 0 days.

(21) Appl. No.: 18/698,485

(22) PCT Filed: Aug. 24, 2022

(86) PCT No.: PCT/KR2022/012637
§ 371 (c)(1),
(2) Date: Apr. 4, 2024

(87) PCT Pub. No.: WO2023/146051
PCT Pub. Date: Aug. 3, 2023

(65) Prior Publication Data
US 2025/0240023 A1    Jul. 24, 2025

(30) Foreign Application Priority Data
Jan. 27, 2022    (KR) .......................... 10-2022-0012647

(51) Int. Cl.
*H03L 7/091* (2006.01)
*H03L 7/099* (2006.01)

(52) U.S. Cl.
CPC ............ *H03L 7/091* (2013.01); *H03L 7/0997* (2013.01)

(58) Field of Classification Search
CPC .............................. H03L 7/091; H03L 7/0997
See application file for complete search history.

(56) References Cited

U.S. PATENT DOCUMENTS 7,999,591 B2 *    8/2011   Kim ..................... H04L 7/0337
                                                       327/284
2013/0249612 A1   9/2013   Zerbe et al.
(Continued)

FOREIGN PATENT DOCUMENTS

KR         101591679 B1    2/2016
KR         20160017254 A   2/2016
(Continued)

OTHER PUBLICATIONS

International Search Report—PCT/KR2022/012637 dated Dec. 2, 2022.

*Primary Examiner* — Janice N Tieu
(74) *Attorney, Agent, or Firm* — CANTOR COLBURN LLP

(57) ABSTRACT

A data reception device includes a reference clock generation unit including a first DCDL, a phase detection circuit, and a digital loop filter, and receiving an input clock signal CK0 and outputting the input clock signal and a first phase clock signal CK90 having a phase difference of 90 degrees with respect to the input clock signal; and a data sampling unit including a second DCDL that receives a data signal DI, the input clock signal, and the first phase clock signal, and delays the data signal, and sampling and outputting a data value of the data signal at an edge of the input clock signal, thereby remarkably reducing an amount of power consumption used for skew correction.

8 Claims, 13 Drawing Sheets

(56) References Cited

U.S. PATENT DOCUMENTS

2015/0326229 A1* 11/2015 Boecker ............... H04L 7/0337
327/158
2019/0287587 A1* 9/2019 Kim ...................... G11C 27/02

FOREIGN PATENT DOCUMENTS

KR   20170040732 A   4/2017
WO     2008032701 A1   3/2008

* cited by examiner

Normal mode

DATA RECEPTION DEVICE BASED ON LOW-POWER DIGITAL DELAY-LOCKED LOOP HAVING SKEW CORRECTION FUNCTION

TECHNICAL FIELD

The present disclosure relates to a data reception device based on a low-power digital delay-locked loop having a skew correction function.

BACKGROUND ART

In the case of a source-synchronous system in which clock and data are transmitted together, such as MIPI DPHY, which is widely used as a mobile interface, when data and clock signals are input with skew due to a difference in the lengths of transmission lines or an inaccuracy in the transmitting unit, it is necessary to correct the skew and restore accurate sampling timing. In this case, a structure based on the delay-locked loop (DLL), which is beneficial in terms of simplicity and power/area of circuitry, is more advantageous than that based on a phase-locked Loop (PLL), which generates an independent clock through a local oscillator for each lane.

Meanwhile, power consumption occurs for skew correction, and there is a need to develop technology that can reduce such power consumption.

(Patent Document 1) KR10-2234594 B1 (published on Apr. 5, 2021)

DISCLOSURE OF INVENTION

Technical Problem

An aspect of the present disclosure may provide a data reception device based on a low-power digital delay-locked loop having a skew correction function that can correct skew while reducing power consumption.

Technical Solution

A data reception device based on a low-power digital delay-locked loop having a skew correction function according to an embodiment of the present disclosure may include a reference clock generation unit including a first DCDL, a phase detection circuit, and a digital loop filter, and receiving an input clock signal CK0 and outputting the input clock signal and a first phase clock signal CK90 having a phase difference of 90 degrees with respect to the input clock signal; and a data sampling unit including a second DCDL that receives a data signal DI, the input clock signal, and the first phase clock signal, and delays the data signal, and sampling and outputting a data value of the data signal at an edge of the input clock signal, wherein an operation section of the data sampling unit includes a first section operating in a skew correction value measurement mode that finds a skew correction setting value of the second DCDL that delays the data signal so that a data value transition point of the data signal corresponds to an edge of the first phase clock signal; and a second section operating in a normal mode that samples and outputs a data value of the data signal delayed by the second DCDL in which the skew correction setting value is set, using an edge of the input clock signal CK0.

Furthermore, the second DCDL may include a plurality of delay modules, each of which includes a first inverter whose delay value is adjusted by an R-code, and the R-code may be determined to correspond to a control value of the first DCDL in a state where the reference clock generation unit is stabilized.

Furthermore, at least one of the first DCDL, the phase detection circuit, and the digital loop filter may be turned off during the second section.

Furthermore, the data sampling unit may include a second DCDL control circuit that adjusts a delay time of the second DCDL, and a number of delay modules that are present on a delay path to consume power may be determined from among the plurality of delay modules by a D-code output from the second DCDL control circuit in a state where the second DCDL is stabilized.

Furthermore, at least one of the first DCDL, the phase detection circuit, the digital loop filter, and the second DCDL control circuit may be turned off during the second section.

Furthermore, the first DCDL may include a first stage in which a delay interval is adjusted to be relatively large and a second stage in which a delay interval is adjusted to be relatively small, a control value of the first DCDL may include a C-code and an F-code, a delay interval of the first stage may be adjusted by the C-code, a delay interval of the second stage may be adjusted by the F-code, and the R-code may be determined by a look-up table (LUT) consisting of the C-code, the F-code, and the R-code.

Furthermore, the first stage may include a plurality of delay units in which delay path on and off are controlled, and the second stage may include an inverter and a variable capacitor, wherein the C-code controls a number of applied delay units, and the F-code controls a capacitance of the variable capacitor.

Furthermore, the data signal may be provided through a plurality of data lanes, and for each of the plurality of data lanes, when a sum of first skew correction values based on the input clock signal is greater than that of second skew correction values based on a second phase clock signal delayed from the input clock signal by a predetermined first time period, the input clock signal may be replaced with the second phase clock signal, and the first phase clock signal may be replaced with a third phase clock signal delayed from the first phase clock signal by a first time period.

Advantageous Effects

According to an embodiment of the present disclosure, a useful effect capable of significantly reducing power consumption used for skew correction is provided.

BEST MODE FOR CARRYING OUT THE INVENTION

Figure 1:
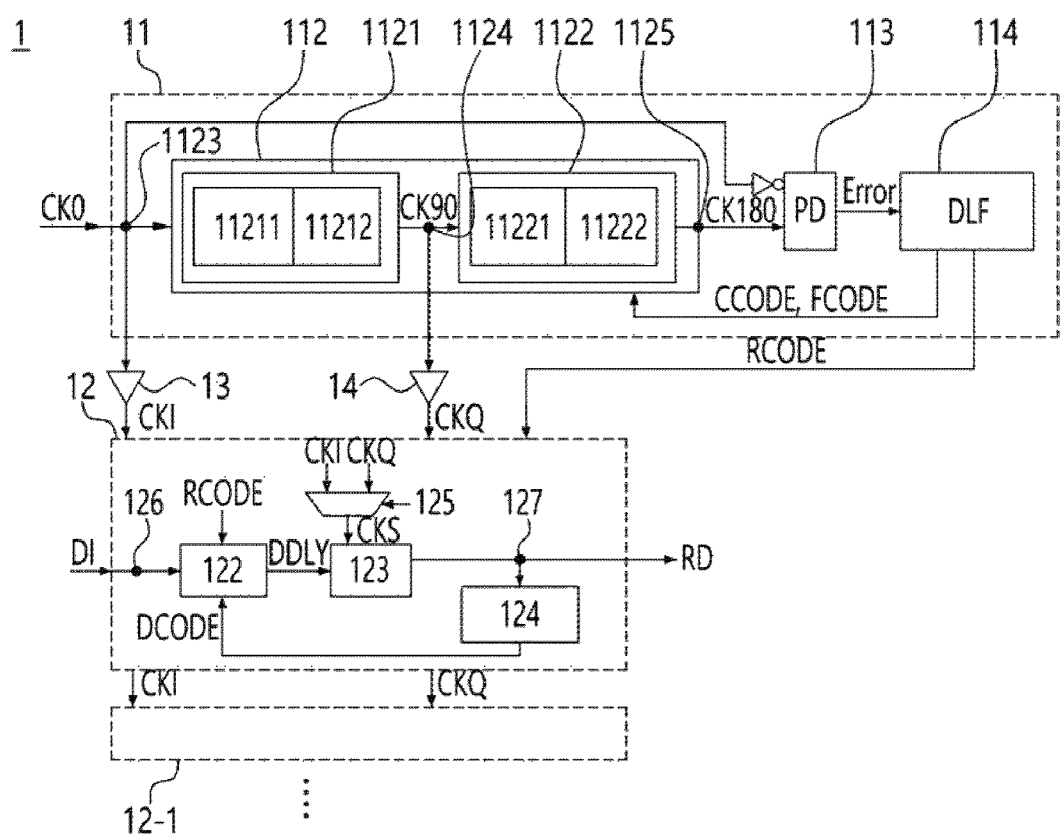
FIG. 1 is a diagram schematically illustrating a data reception device based on a low-power digital delay-locked loop having a skew correction function according to an embodiment of the present disclosure.

Hereinafter, with reference to the accompanying drawings, a data reception device based on a low-power digital delay-locked loop having a skew correction function according to a preferred embodiment will be described in detail as follows. Herein, the same reference numerals are used for the same components, and a redundant description, and a detailed description of known functions and configurations that may unnecessarily obscure the subject matter of the disclosure will be omitted. Embodiments of the disclosure are provided to more fully describe the present disclosure for those skilled in the art. Accordingly, the shapes and sizes of elements in the drawings may be exaggerated for clarity.

A data reception device 1 based on a low-power digital delay-locked loop having a skew correction function according to an embodiment of the present disclosure includes a reference clock generation unit 11 and a data sampling unit 12.

Figure 7:
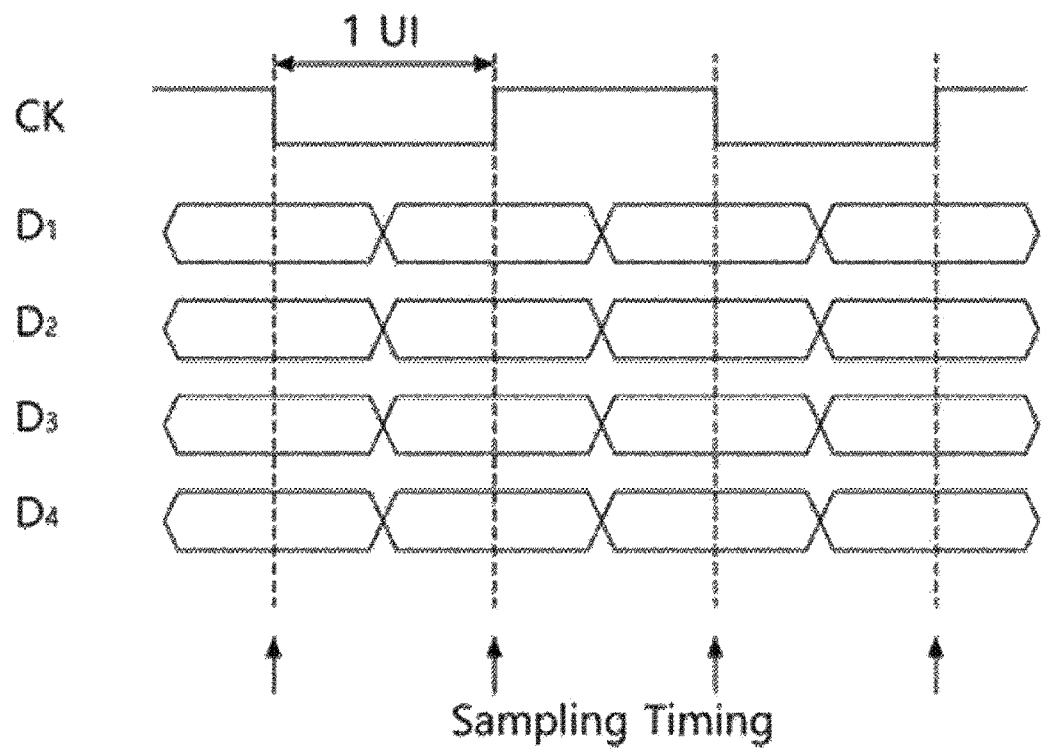
FIG. 7 is a diagram schematically illustrating a timing relationship between a clock signal and a data signal in an ideal situation.
Figure 8:
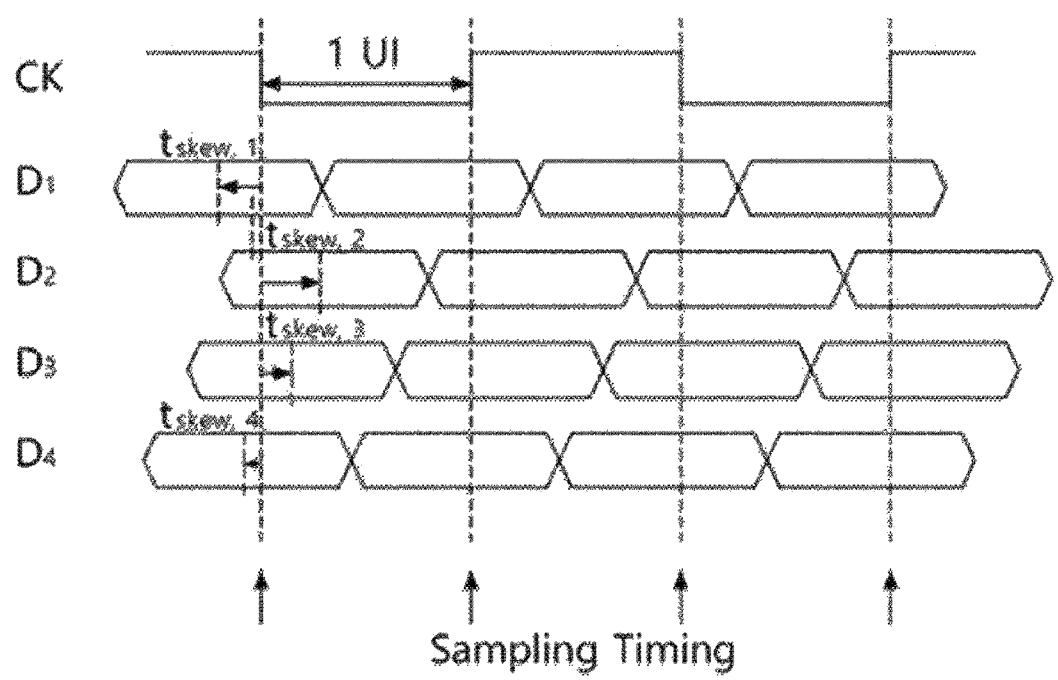
FIG. 8 is a diagram schematically illustrating a timing relationship between a clock signal and a data signal in an actual situation.
Figure 9:
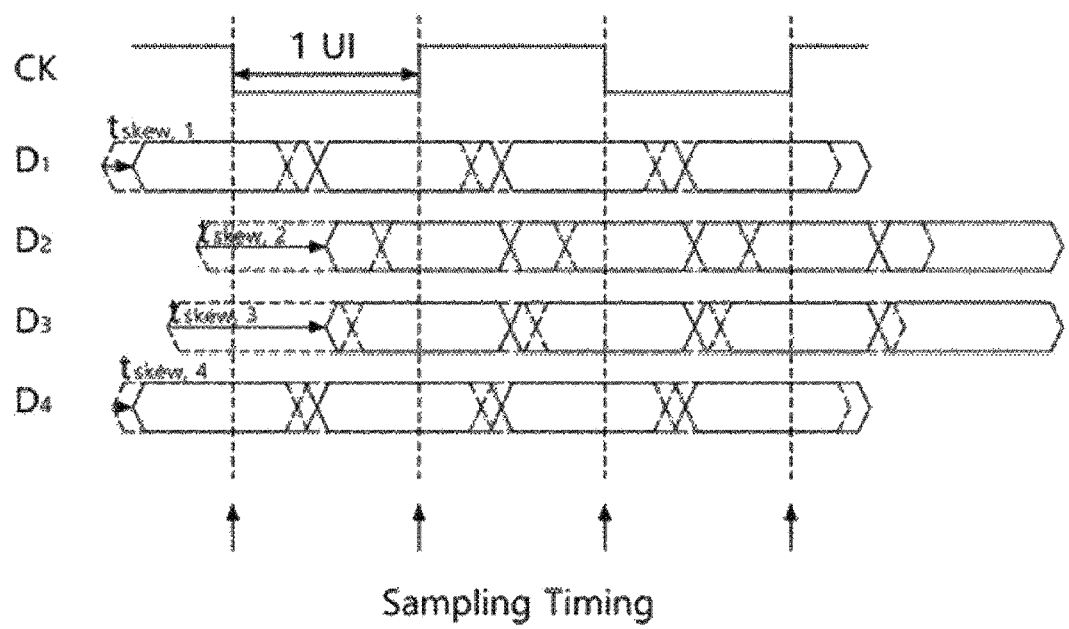
FIG. 9 is a diagram schematically illustrating a timing relationship between a clock signal and a data signal subsequent to skew correction for the situation illustrated in FIG. 8.
Figure 10:
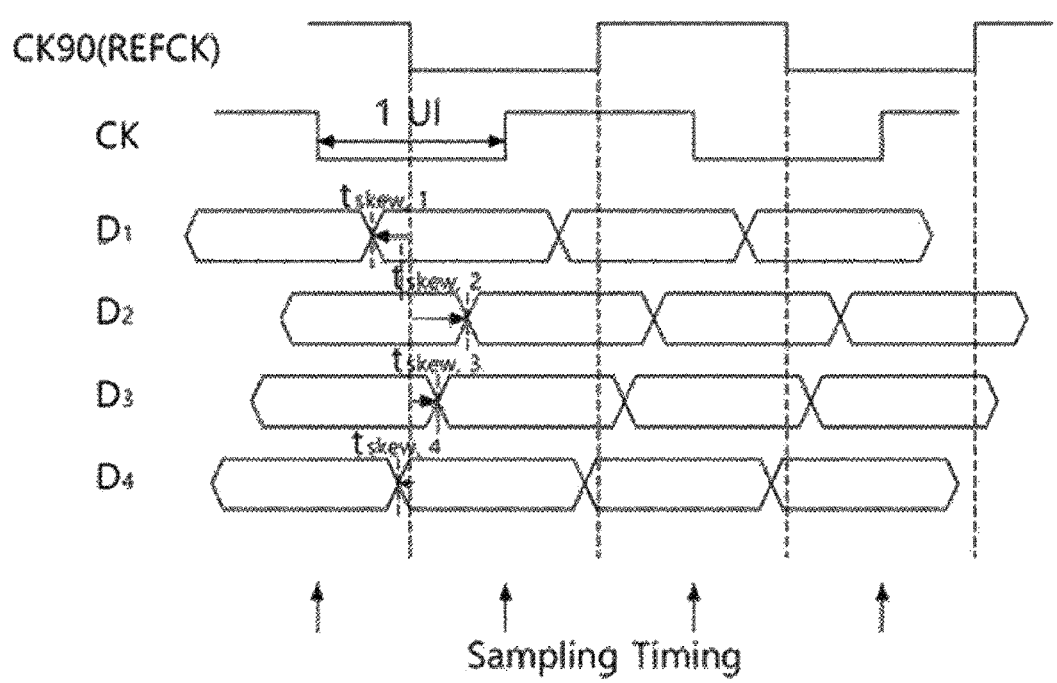
FIG. 10 is a diagram for explaining a principle of skew measurement.

As illustrated in FIGS. 7 to 9, unlike the timing of clock and data signals in an ideal situation, skew may occur in each data lane in an actual situation. A skew correction process may consist of a process of internally generating a reference clock necessary to measure skew and a process of measuring and correcting the skew amount using the generated reference clock and data delay line. At this time, in a case where there is 1 UI data slip subsequent to correction, when restoration can be supported in the protocol domain like the MIPI DPHY standard, the content of data may be checked and restored. As a result, through performing skew correction, a timing margin (a time period from a sampling clock to the closest data transition point) may be maximized (~0.5 UI) when sampling data using a clock.

In a standard such as MIPI DPHY, a clock signal CK and a data signal Dn have a 90-degree phase difference, so a first phase clock signal CK90, which has a 90-degree phase difference with an input clock signal CK0, may be used as a reference clock for skew correction. A desired timing relationship between the clock signal and the data signal may be generated by adjusting a delay so that a data value transition point of each data lane overlaps a rising edge or falling edge of the reference clock. In order to delay data to a desired position, the reference clock essentially provides reference timing information to the data.

The reference clock generation unit 11 includes a first digitally-controlled delay line (DCDL) 112, a phase detection circuit 113, and a digital loop filter 114, and is provided in a clock lane to perform a function of generating a reference clock for measuring a skew correction value.

The reference clock generation unit 11 may have a DLL structure. The reference clock generation unit 11 generates a clock signal CK180 in which a phase of the input clock signal CK0 is delayed by 1 unit interval (UI) (e.g., 180 degrees), and compares the phase of the input clock signal with that of an inverted signal thereof through the phase detection circuit 113 to adjust a delay time of the first DCDL 112. At this time, a signal for adjusting the first DCDL 112 may be generated by the digital loop filter 114, and may be expressed as a code value, such as a C-code or D-code.

In one embodiment, the input clock signal CK0 may be a signal obtained by passing a signal input in a differential mode through a differential-to-single-ended circuit.

In one embodiment, the first DCDL 112 may include a first stage 1121 and a second stage 1122, and each of the first and second stages may include a primary stage 11211, 11221 and a secondary stage 11212, 11222. A first node 1123 to which the input clock signal CK0 is applied is provided in front of the first stage 1121, a first phase clock signal CK90 is output from a second node 1124 between the first stage 1121 and the second stage 1122, and a clock signal CK180 in which a phase of the input clock signal CK0 is delayed by 1 unit Interval (UI) (e.g., 180 degrees) is output from a third node 1125 between the second stage 1122 and the phase detection circuit 113. When the characteristics of both the first stage 1121 and the second stage 1122 are implemented in the same manner, the first phase clock signal CK90 output from the second node 1124 is 90 degrees faster in phase than the clock signal CK180.

The first DCDL 112 may include a primary stage 11211 and a secondary stage 11212. The primary stage 11211 may have a relatively large delay interval adjustment unit, and the secondary stage 11212 may have a relatively small delay interval adjustment unit. For example, a delay interval of the primary stage 11211 may be adjusted in units of 20 ps, and a delay interval of the secondary stage 11212 may be adjusted in units of 1 ps.

A signal for adjusting the first DCDL 112 may include a C-code (coarse control code) and an F-code (fine control code), and the C-code may adjust the primary stage 11211, and the F-code may adjust the secondary stage 11212.

Figure 3:
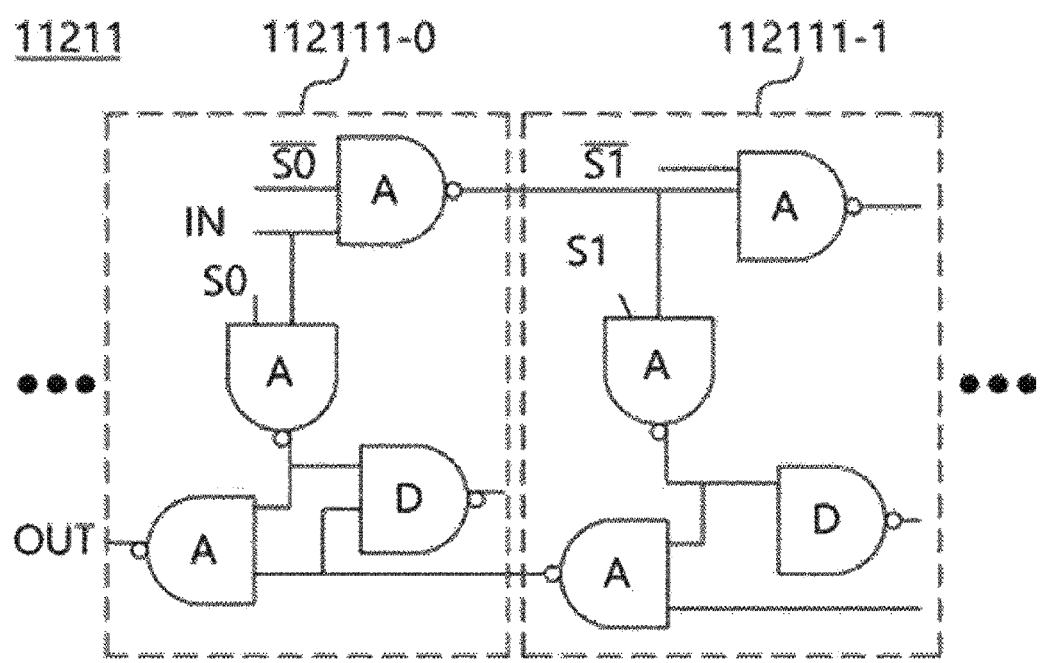
FIG. 3 is a diagram schematically illustrating a first stage of the data reception device based on a low-power digital delay-locked loop having a skew correction function according to an embodiment of the present disclosure.
Figure 4:
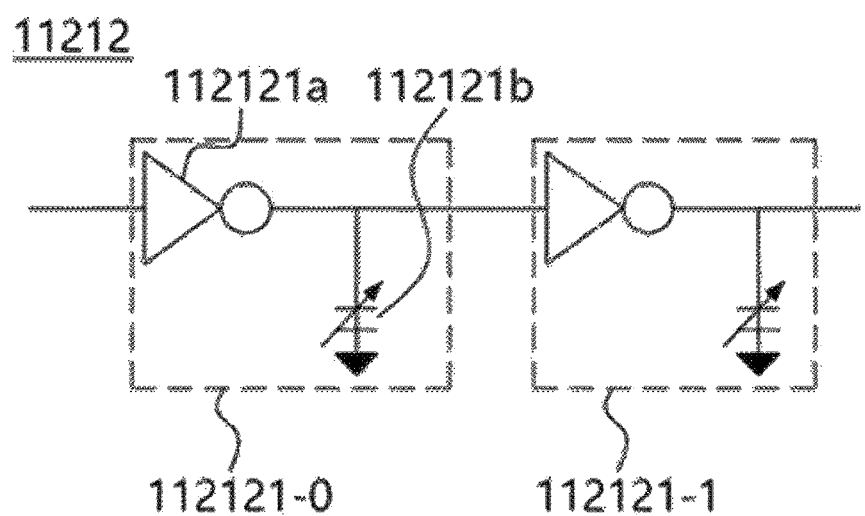
FIG. 4 is a diagram schematically illustrating a second stage of the data reception device based on a low-power digital delay-locked loop having a skew correction function according to an embodiment of the present disclosure.
Figure 5:
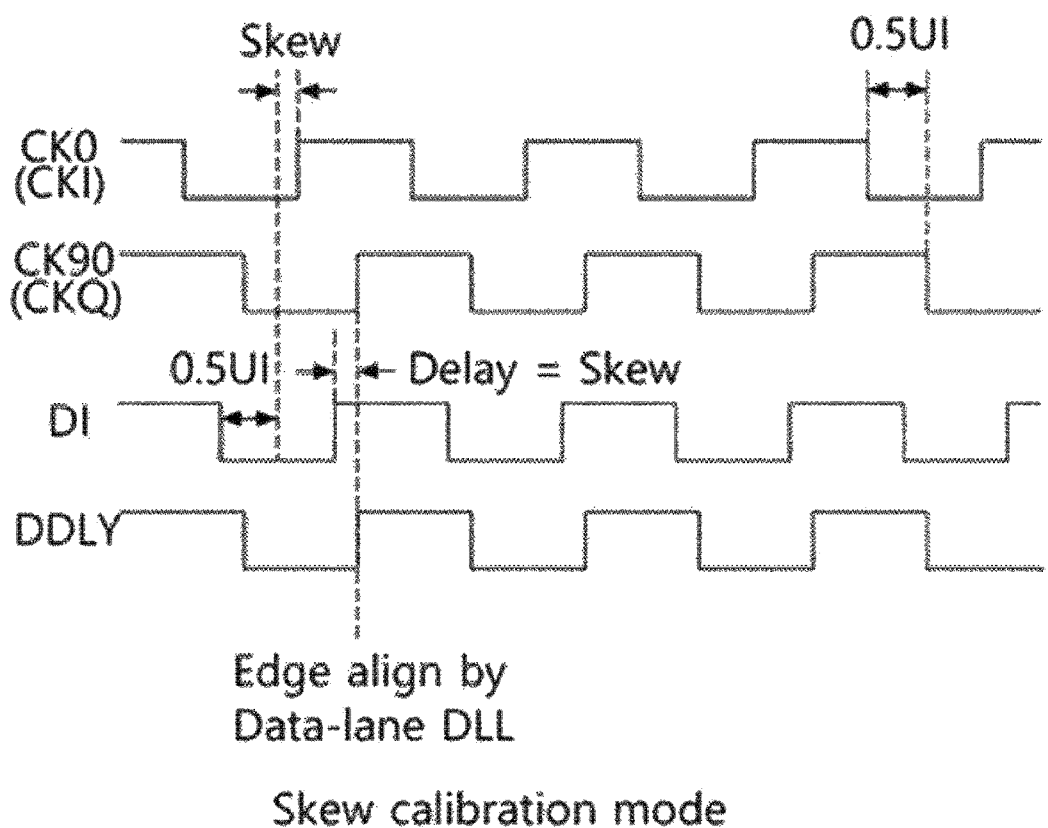
FIG. 5 is a diagram for explaining a skew correction value measurement mode of the data reception device based on a low-power digital delay-locked loop having a skew correction function according to an embodiment of the present disclosure.
Figure 6:
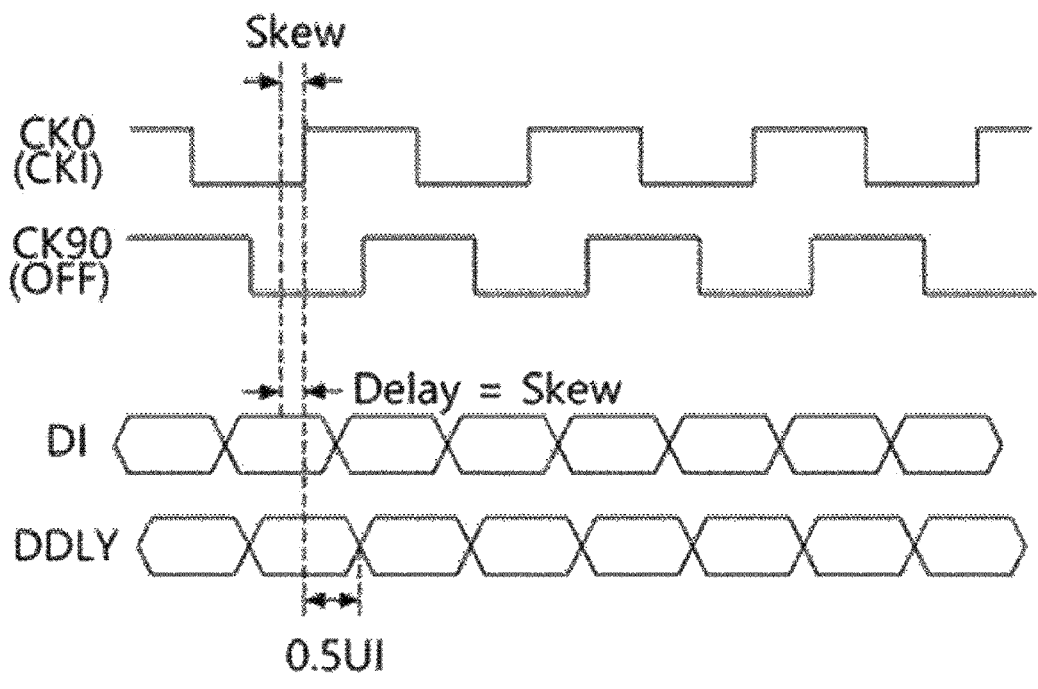
FIG. 6 is a diagram for explaining a normal mode of the data reception device based on a low-power digital delay-locked loop having a skew correction function according to an embodiment of the present disclosure.

FIG. 3 illustrates an example of a coarse stage circuit corresponding to the primary stage 11211, and FIG. 4 illustrates an example of a fine stage circuit corresponding to the secondary stage 11212. In one embodiment, the primary stage 11211 may include a plurality of first delay units 112111-0, 112111-1 in which delay path on and off are controlled, and a number of the first delay units 112111-0, 112111-1 applied thereto may be controlled by a C-code, and accordingly, a delay interval by the primary stage 11211 may be adjusted. In one embodiment, the secondary stage 11212 may include one or more second delay units 112121-0, 112121-1, each consisting of a second inverter 112121a and a variable capacitor 112121b, and a capacitance of the variable capacitor 112121b may be adjusted by an F-code, thereby finely adjusting a delay interval by the secondary stage 11212.

In one embodiment, the reference clock generation unit 11 is implemented in a wide range to have a sufficient margin in consideration of an operation speed range and a PVT influence. Additionally, a delay adjustment step must be controlled in a sufficiently fine manner to obtain a precise skew correction result. In consideration of the above, the primary stage 11211 that allows a delay to be quickly adjusted in a wide range and the secondary stage 11212 that allows the delay to be finely adjusted in a narrow range are included in the first DCDL 112. In addition, the reference clock generation unit 11 may be turned off for most of the time other than a section for adjusting skew, and thus may be free from limitations such as power consumption and may be optimized for required performance (operation range, precision).

As described above, the primary stage 11211 and the second stage 11212 may be included in the first DCDL 112 to quickly and precisely generate the first phase clock signal CK90 for measuring a skew correction value, and may be turned off after the skew correction, and as a result, the power consumption of the data reception device 1 based on a low-power digital delay-locked loop having a skew correction function may be reduced.

The data sampling unit 12 includes a second DCDL 122, and is provided in each data lane to sample data to perform a function of correcting skew.

The data sampling unit 12 receives a data signal, an input clock signal CK0, and a first phase clock signal CK90, delays the data signal with the second DCDL 122 to measure a skew correction value, performs skew correction, and samples and output data from the data signal for which skew correction has been completed.

In one embodiment, a data signal DI may be input through a fourth node 126, and the input clock signal CK0 and the first phase clock signal CK90 may be input to a mode selection circuit 125. The mode selection circuit 125 outputs the first phase clock signal CK90 in a skew correction value measurement mode, and outputs the input clock signal CK0 in a normal mode.

In one embodiment, the sampling circuit 123 samples a data signal delayed by the second DCDL 122 according to a clock signal provided from the mode selection circuit 125 and outputs the sampled data signal to a fifth node 127.

In one embodiment, an operation section of the data sampling unit 12 may include a first section operating in a skew correction value measurement mode and a second section operating in a normal mode.

The skew correction value measurement mode may be performed by finding a skew correction setting value of the second DCDL 122, which delays a data signal so that a data value transition point of the data signal corresponds to an edge of the first phase clock signal CK90.

The normal mode may be performed by sampling a data value from a data signal DDLY delayed by the second DCDL 122, which is set to a skew correction setting value, and sampling at an edge of the input clock signal CK0.

In one embodiment, the second DCDL 122 includes a plurality of delay modules 1221-1, 1221-2, 1221-3. At this time, each of the delay modules 1221-1, 1221-2, 1221-3 may include a first inverter 12211, and a delay value may be adjusted by an R-code (range control code). For example, when an R-code value is 1, a delay value of the first inverter 12211 may be 5 ps, and when the R-code value is 10, the delay value of the first inverter 12211 may be 50 ps. Through these means, the second DCDL 122 may be configured with fewer delay modules 1221-1, 1221-2, 1221-3 than those of the existing method, and accordingly, the area and power consumption of the second DCDL 122 may be reduced. That is, when a delay line of a data lane is implemented using delay modules 1221-1, 1221-2, 1221-3 with a fixed delay value of 5 ps, 60 delay modules 1221-1, 1221-2, 1221-3 must operate to correct a skew of 300 ps, but when a delay value of the delay modules 1221-1, 1221-2, 1221-3 can be adjusted as shown in one embodiment of the present disclosure (e.g., when a delay value of the delay modules 1221-1, 1221-2, 1221-3 can be increased to 20 ps), skew correction may be sufficiently performed even when operating only 15 delay modules 1221-1, 1221-2, 1221-3, thereby improving the area and power consumption efficiency of the circuit.

Figure 13:
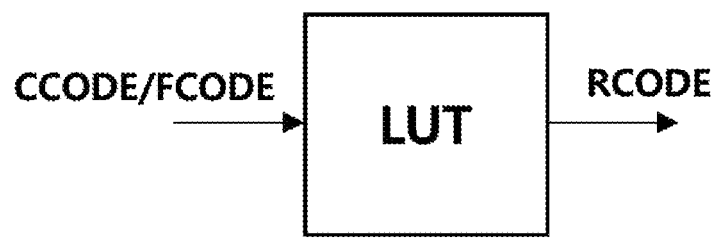
FIG. 13 is a diagram illustrating a look-up table of the data reception device based on a low-power digital delay-locked loop having a skew correction function according to an embodiment of the present disclosure.

In one embodiment, an R-code may be determined to correspond to a control value (e.g., C-code, F-code) of the first DCDL 112 in a state where the reference clock generation unit 11 is stabilized and provided to the second DCDL 122. In one embodiment, as illustrated in FIG. 13, a look-up table (LUT) that outputs an R-code using a C-code and an F-code as an input may be used, and the look-up table may be set in advance through a sufficient number of sample measurements reflecting various conditions including an operation speed and a PVT variation.

The characteristics of the first DCDL 112 and the second DCDL 122 are affected by a process, an operation voltage, and an operation temperature (PVT), and thus designed with a sufficient design margin, but this design margin results in an increase in area and operation current, thereby requiring an optimization design thereof.

In general, there is only one first DCDL 112 provided in a clock lane, but a plurality of second DCDLs 122 provided in each data lane are required. Therefore, when the area and operation current of the second DCDL 122 can be reduced, it may greatly help in reducing the overall power and area of the data reception device 1 based on a low-power digital delay-locked loop having a skew correction function.

After the operation of the reference clock generation unit 11 is stabilized, a clock signal CK180 having a delay time of 1 UI may be generated from the input clock signal CK0, and a C-code and an F-code that adjust the delay time may be determined. At this time, it can be seen that the C-code and the F-code reflect a current operating condition, including both an operation speed and a PVT of the circuit. This value may be used to determine a delay range of the second DCDL 122 using a look-up table. Here, the second DCDL 122 is a block that has two input values, an R-code (range) and a D-code (data line control code) that determine the delay.

Figure 2:
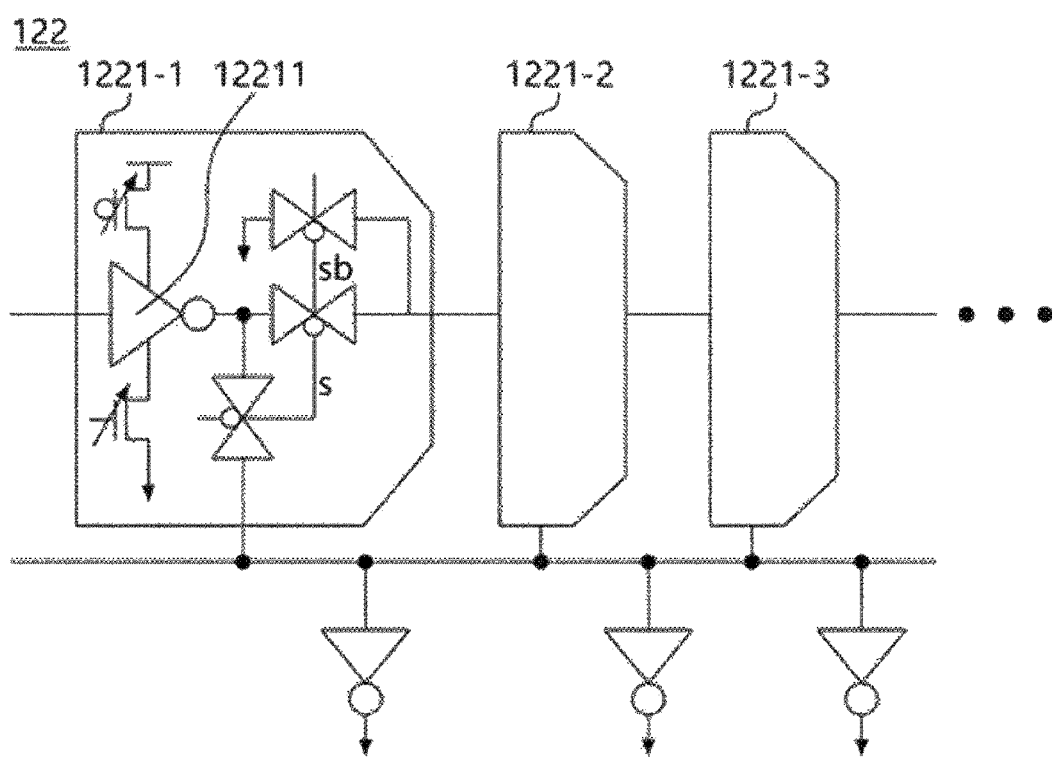
FIG. 2 is a diagram schematically illustrating a second DCDL of the data reception device based on a low-power digital delay-locked loop having a skew correction function according to an embodiment of the present disclosure.

FIG. 2 illustrates a circuit diagram of the second DCDL 122 of the data reception device 1 based on a low-power digital delay-locked loop having a skew correction function according to an embodiment of the present disclosure. In one embodiment, the R-code may adjust the strength of transistors constituting each of the delay modules 1221-1, 1221-2, 1221-3 so that each of the delay modules 1221-1, 1221-2, 1221-3 is insensitive to a change in PVT to have a constant unit delay time at the corresponding operation speed.

The second DCDL 122, which is a delay line of a data lane, may activate the delay modules 1221-1, 1221-2, 1221-3 only by an amount corresponding to a delay amount required therefor, and propagate a predetermined fixed value to the delay modules 1221-1, 1221-2, 1221-3 followed by the required delay modules 1221-1, 1221-2, 1221-3 to inhibit power consumption. Therefore, power consumption may increase in the second DCDL 122 as a delay value that must be set for skew correction increases, and in the opposite case, the power consumption decreases, thereby achieving optimal power consumption under a given skew condition.

In one embodiment, the first DCDL 112, the phase detection circuit 113, the digital loop filter 114, and a second DCDL control circuit 124 may operate only in the first section operated in a skew correction value measurement mode, and enter a power-down state in the second section operated in a normal mode to reduce operation power consumption.

In one embodiment, after the reference clock generation unit 11 has completed the generation of the reference clock that is required for skew correction, since the C-code and F-code is not changed, and the R-code determined by matching the C-code and F-code with a look-up table is also not changed, the reference clock generation unit 11 may be in a state where power consumption is minimized while providing only the input clock signal CK0 and the R-code to the data sampling unit 12.

In one embodiment, a change in skew resulting from a change in voltage, temperature, and the like that occur during operation may periodically activate a correction mode to respond by selectively updating the C-code, F-code, R-code, and D-code.

Figure 12:
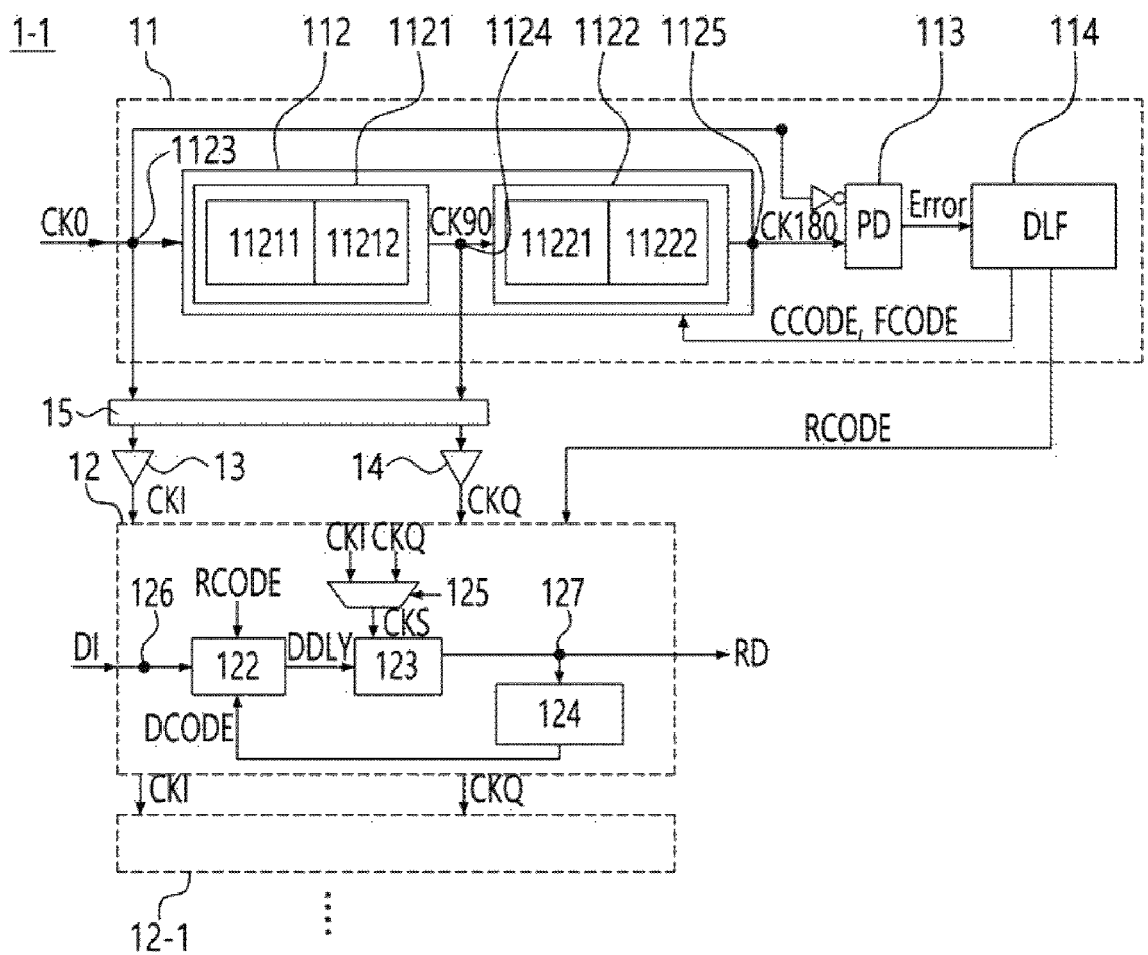
FIG. 12 is a diagram schematically illustrating a data reception device based on a low-power digital delay-locked loop having a skew correction function according to another embodiment of the present disclosure.

In one embodiment, for each of a plurality of data lanes, in case where a sum of second skew correction values based on the second phase clock signal delayed from the input clock signal CK0 by a predetermined first time period is smaller than that of first skew correction values based on the input clock signal CK0, the input clock signal CK0 may be replaced with a second phase clock signal, and the first phase clock signal CK90 may be replaced with a third phase clock signal obtained by delaying the first phase clock signal CK90 by the first time period. To this end, as illustrated in FIG. 12, a delay circuit 15 may be provided between the reference clock generation unit and the data sampling unit.

When the skew is positive, a relatively larger correction delay is required compared to when the skew is negative according to a relationship of 1 UI-$t_{skew}$ in Equation 1 below, which requires a greater number of delay modules 1221-1, 1221-2, 1221-3 to operate in the second DCDL 122, resulting in an increase in power consumption.

$$t_{comp,n} = \begin{cases} -t_{skew,n} & (t_{skew,n} < 0) \\ 1UI - t_{skew,n} & (t_{skew,n} \geq 0) \end{cases} \quad \text{[Equation 1]}$$

1. Measure $t_{skew,n}$

2. Add $t_{comp,n}$ to data lane

For example, in a case where the $t_{skew,n}$ of [D1, D2, D3, D4] is [−0.3, −0.1, 0.1, 0.3] UI, when considering only D2, it is advantageous to compensate by delaying the clock signal by 0.1 UI, but since the input clock signal CK0 affects all lanes, a method of delaying D2 by 0.9 UI is adopted. Therefore, at this time, $t_{comp}$ has [0.3, 0.1, 0.9, 0.7] UI.

At this time, when the input clock signal CK0 is pushed by 0.3 UI, $t_{skew,n}$ becomes [−0.6, −0.4, −0.2, 0], and $t_{comp}$ to be compensated for in the second DCDL 122 becomes [0.6, 0.4, 0.2, 0].

When the power required to delay the input clock signal CK0 is not considered, a power reduction effect of approximately 0.8 may be expected in the second DCDL 122.

{(0.3 0.1 0.9 0.7 = 2) −> (0.6 0.4 0.2 0 = 1.2)}

As shown in the above example, if it is advantageous to configure $t_{comp}$ by setting $T_{comp,ck}$=max ($t_{skew,n}$), then power consumption may be optimized by placing a delay circuit (15 in FIG. 12) in a clock path.

Figure 11:
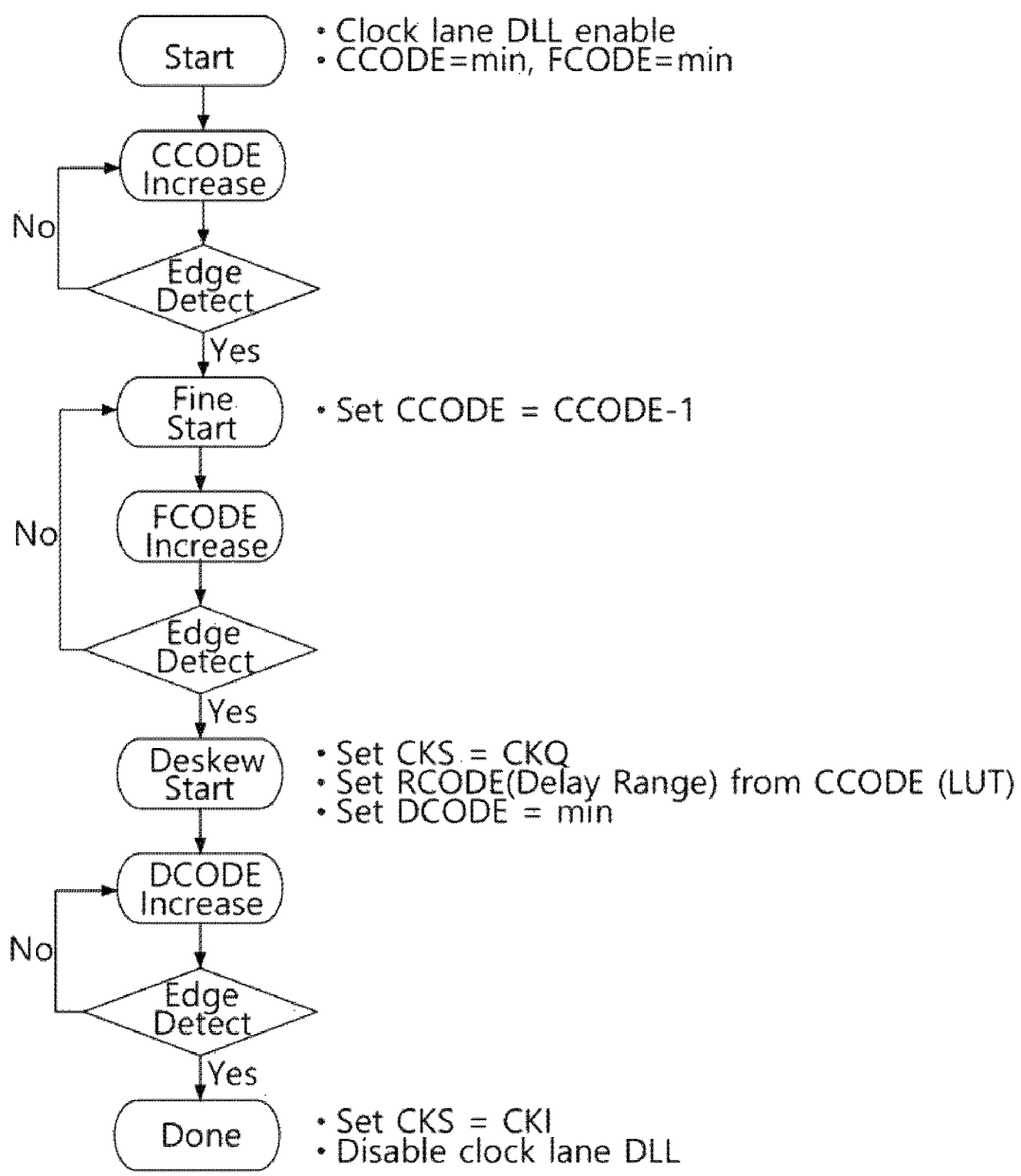
FIG. 11 is a flowchart for explaining an operation principle of a data reception device based on a low-power digital delay-locked loop having a skew correction function according to an embodiment of the present disclosure.

Referring to FIG. 11, a skew correction process may include generating a reference clock, optimizing a delay of a data lane using the reference clock, and setting the optimized delay and then cutting the power of the reference clock generation unit 11.

First, the generating of a reference clock may include:
coarse reference clock positioning in a wide range through a C-code adjustment, and
fine reference clock positioning through an F-code adjustment.

The optimizing of a delay of a data line using the reference clock may include setting a delay range of a data delay line (applying an R-code) using the previously determined C-code, F-code, and a pre-prepared look-up table, and then aligning an edge of the reference clock and a data value transition point while adjusting a D-code.

Meanwhile, such an entire process must be performed at the beginning of skew correction, but when a fine adjustment is required during operation, some of the initial steps may be omitted and only the latter process may be repeated, thereby minimizing a time period taken for skew correction.

DESCRIPTION OF SYMBOLS

1: Data reception device based on low-power digital delay-locked loop having skew correction function
11: Reference clock generation unit
112: First digitally-controlled delay line (DCDL)
1121: First stage
11211: Primary stage
112111-0, 112111-1: First delay unit
11212: Secondary stage
112121-0, 112121-1: Second delay unit
112121a: Second inverter
112121b: Variable capacitor
1122: Second stage
1123: First node 1124: Second node 1125: Third node
113: Phase detection circuit
114: Digital loop filter
12: Data sampling unit
122: Second digitally-controlled delay line (DCDL)
1221-1, 1221-2, 1221-3: Delay module
12211: First inverter
123: Sampling circuit 124: Second DCDL control circuit
125: Mode selection circuit 126: Fourth node 127: Fifth node
13: First buffer 14: Second buffer 15: Delay circuit

INDUSTRIAL APPLICABILITY

A data reception device based on a low-power digital delay-locked loop having a skew correction function according to an embodiment of the present disclosure can be used to build a data transmission and reception interface between the transmitting side and the receiving side. In particular, it is advantageous for reducing the power consumption of a data transmission and reception interface while correcting skew in the process of transmitting an image sensor output value of a camera to a processor. Accordingly, it can be used in the next-generation automobile industry such as high-speed transmission and reception of a large amount of data between a sensor and a processor for autonomous vehicles, and in the wired communication industry such as ultra high-speed and large-capacity video data.

The invention claimed is:

1. A data reception device based on a low-power digital delay-locked loop having a skew correction function, the device comprising:
   a reference clock generation unit comprising a first digitally-controlled delay line (DCDL), a phase detection circuit, and a digital loop filter, and receives an input clock signal CK0 and outputs the input clock signal and a first phase clock signal CK90 having a phase difference of 90 degrees with respect to the input clock signal; and
   a data sampling unit comprising a second DCDL that receives a data signal DI and delays the data signal DI, wherein the data sampling unit receives the input clock signal, and the first phase clock signal, and samples and outputs a data value of the data signal at an edge of the input clock signal,
   wherein an operation section of the data sampling unit comprises:
   a first section operating in a skew correction value measurement mode that finds a skew correction setting value of the second DCDL that delays the data signal so that a data value transition point of the data signal corresponds to an edge of the first phase clock signal; and
   a second section operating in a normal mode that samples, at the edge of the input clock signal CK0, the data value of the data signal delayed by the second DCDL in which the skew correction setting value is set.

2. The device of claim 1, wherein the second DCDL comprises a plurality of delay modules, each of which comprises a first inverter whose delay value is adjusted by an R-code, and
   wherein the R-code is determined to correspond to a control value of the first DCDL in a state where the reference clock generation unit is stabilized.

3. The device of claim 2, wherein at least one of the first DCDL, the phase detection circuit, and the digital loop filter is turned off during the second section.

4. The device of claim 2, wherein the data sampling unit comprises a second DCDL control circuit that adjusts a delay time of the second DCDL, and a number of delay modules that are present on a delay path to consume power is determined from among the plurality of delay modules by a D-code output from the second DCDL control circuit in a state where the second DCDL is stabilized.

5. The device of claim 4, wherein at least one of the first DCDL, the phase detection circuit, the digital loop filter, and the second DCDL control circuit is turned off during the second section.

6. The device of claim 2, wherein the first DCDL comprises a first stage in which a delay interval is adjusted to be relatively large and a second stage in which a delay interval is adjusted to be relatively small, a control value of the first DCDL comprises a C-code and an F-code, a delay interval of the first stage is adjusted by the C-code, a delay interval of the second stage is adjusted by the F-code, and the R-code is determined by a look-up table (LUT) consisting of the C-code, the F-code, and the R-code.

7. The device of claim 6, wherein the first stage comprises a plurality of delay units in which delay path on and off are controlled, and the second stage comprises an inverter and a variable capacitor, and
   wherein the C-code controls a number of applied delay units, and the F-code controls a capacitance of the variable capacitor.

8. The device of claim 2, wherein for each of the plurality of data lanes,
   when a sum of first skew correction values based on the input clock signal is greater than that of second skew correction values based on a second phase clock signal delayed from the input clock signal by a predetermined first time period,
   the input clock signal is replaced with the second phase clock signal, and
   the first phase clock signal is replaced with a third phase clock signal delayed from the first phase clock signal by a first time period.

* * * * *